(12) United States Patent
Martinerie et al.

(10) Patent No.: US 9,210,403 B2
(45) Date of Patent: Dec. 8, 2015

(54) SYSTEM FOR SPACE-BASED IMAGING IN THREE DIMENSIONS

(71) Applicant: THALES, Neuilly-sur-Seine (FR)

(72) Inventors: Francis Martinerie, Labarthe sur Leze (FR); Stephane Houzelle, La Salvetat Saint Gilles (FR)

(73) Assignee: Thales, Courbevoie (FR)

( * ) Notice: Subject to any disclaimer, the term of this patent is extended or adjusted under 35 U.S.C. 154(b) by 488 days.

(21) Appl. No.: 13/681,203

(22) Filed: Nov. 19, 2012

(65) Prior Publication Data

US 2013/0135443 A1    May 30, 2013

(30) Foreign Application Priority Data

Nov. 24, 2011    (FR) ..................................... 11 03580

(51) Int. Cl.
| | |
|---|---|
| H04N 13/02 | (2006.01) |
| B64G 1/10 | (2006.01) |
| G01C 11/06 | (2006.01) |
| G05D 1/00 | (2006.01) |
| G05D 1/08 | (2006.01) |
| G06T 7/00 | (2006.01) |

(52) U.S. Cl.
CPC .............. *H04N 13/02* (2013.01); *B64G 1/1021* (2013.01); *B64G 1/1085* (2013.01); *G01C 11/06* (2013.01); *G05D 1/0094* (2013.01); *G05D 1/0883* (2013.01); *G06T 7/0075* (2013.01); *B64G 2001/1028* (2013.01); *G06T 2207/10012* (2013.01); *G06T 2207/10032* (2013.01); *G06T 2207/30181* (2013.01)

(58) Field of Classification Search
CPC ................ H04N 13/02; B64G 1/1021; B64G 2001/1028; B64G 1/1085; G05D 1/0883; G05D 1/0094; G06T 2207/10012; G06T 2207/10032; G06T 2207/30181; G06T 7/0075; G01C 11/06

USPC .............................................. 348/47, 42, 48
IPC ....................................................... H04N 13/02
See application file for complete search history.

(56) References Cited

U.S. PATENT DOCUMENTS

2004/0005091 A1    1/2004    Maruya
2010/0063733 A1*   3/2010    Yunck ........................... 701/213

FOREIGN PATENT DOCUMENTS

JP          2004 351950 A1    2/2004

OTHER PUBLICATIONS

Eurimage Products & Services: "ERS—112," Dec. 31, 2001, pp. 1-2, Retrieved from the Internet: URL:http://www.fcnym.unlp.edu.ar/catedras/geofoto/geo_html/informacion/pdf/Euroimage/ers.pdf on Jun. 14, 2012.

*Primary Examiner* — Sherrie Hsia
(74) *Attorney, Agent, or Firm* — Baker & Hostetler LLP

(57) ABSTRACT

A system for space-based imaging in three dimensions includes at least two satellites in a geocentric orbit in a same orbital plane, a satellite being equipped with equipment for optical imaging in two dimensions and a system for transmitting to the ground images in two dimensions; at least one data receiving station on the ground, connected to a communications network; at least one center for processing the images received in two dimensions from the satellites in order to create resulting images in three dimensions and to broadcast the resulting images in three dimensions, the processing center being connected to the communications network; and, a system for controlling the satellites such that a geographical area of the Earth of which images are to be taken is seen under an angle of incidence with respect to a nadir greater than a minimum threshold and/or less than a maximum threshold.

7 Claims, 7 Drawing Sheets

SYSTEM FOR SPACE-BASED IMAGING IN THREE DIMENSIONS

CROSS-REFERENCE TO RELATED APPLICATION

This application claims priority to foreign French patent application No. FR 1103580, filed on Nov. 24, 2011, the disclosure of which is incorporated by reference in its entirety.

FIELD OF THE INVENTION

The present invention relates to a system for space-based imaging in three dimensions.

Space-based imaging consists in regularly taking images of the whole Earth, or of specific geographical areas, with a sufficient precision and renewal of information. The present invention relates to the supply of images in three dimensions, or 3D, of all or part of the Earth's surface.

BACKGROUND

Systems are known, such as the application known by the name "Google Earth" (registered trademark), which supply 3D images. This application is based on the compilation of images in two dimensions, or 2D images, coming from diverse sources and only rarely updated, typically at intervals of several years.

Optical or radar observation systems exist that are programmed to cover, in one or more passes, geographical areas of the order of 10,000 km². Such a solution is not global, because it only covers small parts of the surface of the Earth.

There also exist specific one-off global missions covering virtually all of the exposed land masses, within a single mission of short duration. These systems do not allow the periodic updating of the information, and do not cover the range of optical imaging in the visible range with high resolution (resolutions of a few tens of cm to a few meters).

There also exist radar missions, referred to as 'tandem missions', composed of two radar satellites travelling in formation. These solutions do not allow the periodic updating of the information, and do not cover the range of optical imaging.

SUMMARY OF THE INVENTION

One aim of the invention is to overcome the aforementioned problems.

According to one aspect of the invention, a system for space-based imaging in three dimensions is provided comprising:
- at least two satellites in a geocentric orbit in the same orbital plane, a satellite being equipped with equipment for optical imaging in two dimensions and with means for transmitting to the ground the images acquired in two dimensions in a configuration for stereoscopic acquisition between the satellites,
- at least one data receiving station on the ground, connected to a communications network,
- at least one centre for processing the images received in two dimensions from the said satellites in order to create resulting images in three dimensions and to broadcast the said resulting images in three dimensions, the said processing centre being connected to the said communications network, and
- means for controlling the said satellites designed to control the satellites such that a geographical area of the Earth of which images are to be taken is seen under an angle of incidence with respect to the nadir greater than a minimum threshold and/or less than a maximum threshold.

Such a system enables the continuous acquisition of observations for long periods of time, the availability of recurrent stereoscopic observations or images, with a high precision and global, together with more frequent updates.

For example, the said minimum threshold is substantially equal to 0°, and/or the said maximum threshold is equal to 30°.

In one embodiment, the said control means are, in addition, designed to control the satellites in such a manner that, at the respective times when images of the geographical area of the Earth are taken, two of the said satellites are situated on either side of a vertical line perpendicular to the said geographical area.

Thus, the system provided supplies a natural stereoscopic configuration, without any specific onboard equipment.

According to one embodiment, the said respective times when the images of the geographical area of the Earth are taken by the two satellites are substantially identical.

Thus, when the satellites are close together, the differences between the two acquisitions are minimal.

In one embodiment, the said means for controlling the said satellites are designed to control the satellites in such a manner that the separation between the said satellites allows the observation of the area to be imaged at different times.

According to one embodiment, the said means for controlling the said satellites are designed to control the roll angle and/or yaw angle and/or pitch angle of the said satellites.

According to another aspect of the invention, a method is also provided for space-based imaging in three dimensions based on the processing of images in two dimensions taken by at least two satellites in heliosynchronous orbit in the same orbital plane and transmitted to at least one data receiving station on the ground, connected to a communications network, in which the said satellites are controlled in such a manner that a geographical area of the Earth of which images are to be taken is seen under an angle of incidence with respect to the nadir greater than a minimum threshold and/or less than a maximum threshold.

BRIEF DESCRIPTION OF THE DRAWINGS

The invention will be better understood upon studying a few embodiments described by way of non-limiting examples and illustrated by the appended drawings in which.

In all of the figures, the elements having the same references are similar.

DETAILED DESCRIPTION

Figure 1:
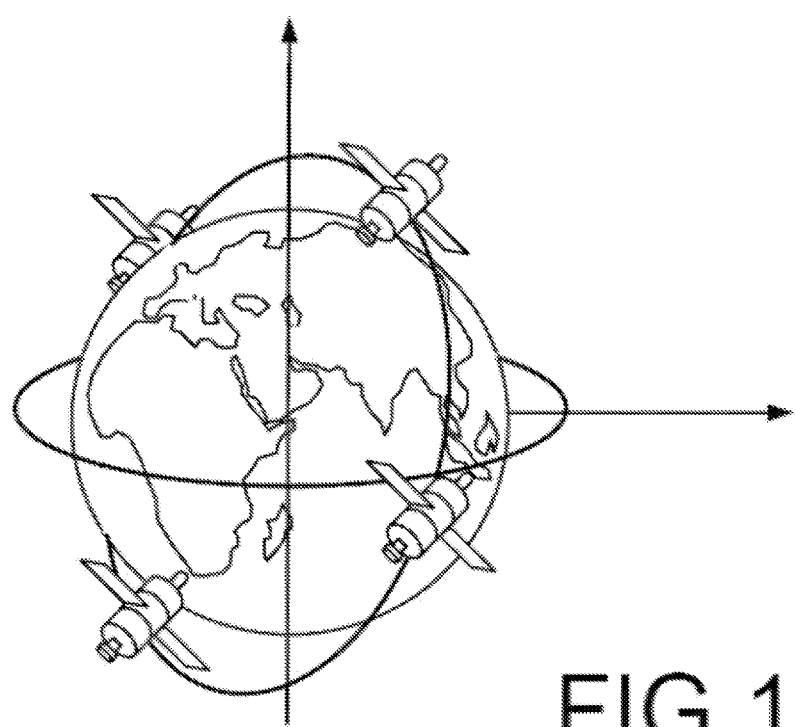
FIG. 1 illustrates schematically a constellation of satellites in heliosynchronous orbit.

FIG. 1 shows an assembly of four satellites in a geocentric orbit in the same orbital plane, for which the altitude and the inclination are chosen in such a manner that the angle between the orbital plane and the direction of the sun remains more or less constant, despite the annual drift of the orbital plane (precession). Thus, a satellite placed in such an orbit passes over a given point of the Earth's surface at the same local solar time. This is desirable when photographs are taken in visible light, because the sun's illumination does not vary too much from one photograph to another (weather satellites, spy satellites, satellites for remote detection, etc.).

The invention takes into account the rotation of the Earth with respect to the plane of the orbit:

A first satellite passes over regions of exposed land mass and takes images of these regions either systematically at the nadir (zero roll and pitch angles), or with a predetermined roll and/or pitch and/or yaw orientation, under an angle of incidence with respect to the nadir greater than a minimum threshold $\alpha_{min}$ and/or less than a maximum threshold $\alpha_{max}$. For example, the minimum threshold is substantially equal to 0°, and/or the maximum threshold is equal to 30°.

The invention is particularly well adapted to orbits whose maximum altitude is 2000 km.

Subsequently, one of the following satellites arrives at the same latitude with a roll angle controlled so that it is able to compensate for the rotation of the Earth, as illustrated in FIG. 1, and to take images of the same regions as the first satellite, such that, at the respective times when the images of the geographical area of the Earth are taken, the satellites are situated on either side of a vertical line perpendicular to the geographical area, and that the geographical area is also seen by the following satellite under an angle of incidence with respect to the nadir greater than a minimum threshold $\alpha_{min}$ and/or less than a maximum threshold $\alpha_{max}$.

These successive passages allow the same region to be acquired with different angles of view, which then allows, on the ground, the composition of digital models of terrain in three dimensions.

For a given separation of the satellites, the roll angle of the following satellite is not constant and decreases when it come close to the poles. The principle therefore involves controlling the roll and/or yaw and/or pitch during the image acquisition with the aim of verifying that the following satellite is still targeting the region photographed by the first satellite at a given latitude. The control of the satellites is in fact aimed at compensating for the proximity of the meridians to the poles.

Figure 2:
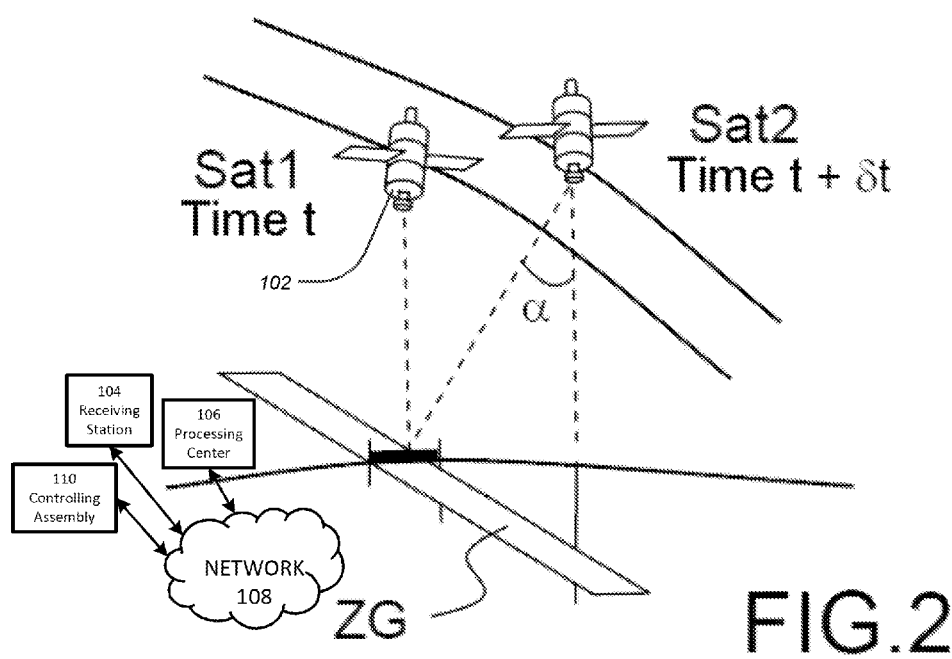
FIG. 2 illustrates schematically the difference in geometrical conditions for acquisition of a geographical area between two satellites of the system situated at different positions in the same orbital plane, due to the rotation of the Earth between the overfly times of the area by one and the other of the satellites, according to one aspect of the invention.

The time difference, illustrated in FIG. 2, between the image acquisition times of different satellites in the same orbit depends on the separation of the satellites within the orbital plane and of the range of variation $[\alpha_{min}, \alpha_{max}]$ of the viewing angle of incidence a with respect to the nadir, the nadir being the direction of a virtual axis passing through the centre of the Earth and the position of the satellite.

Figure 3:
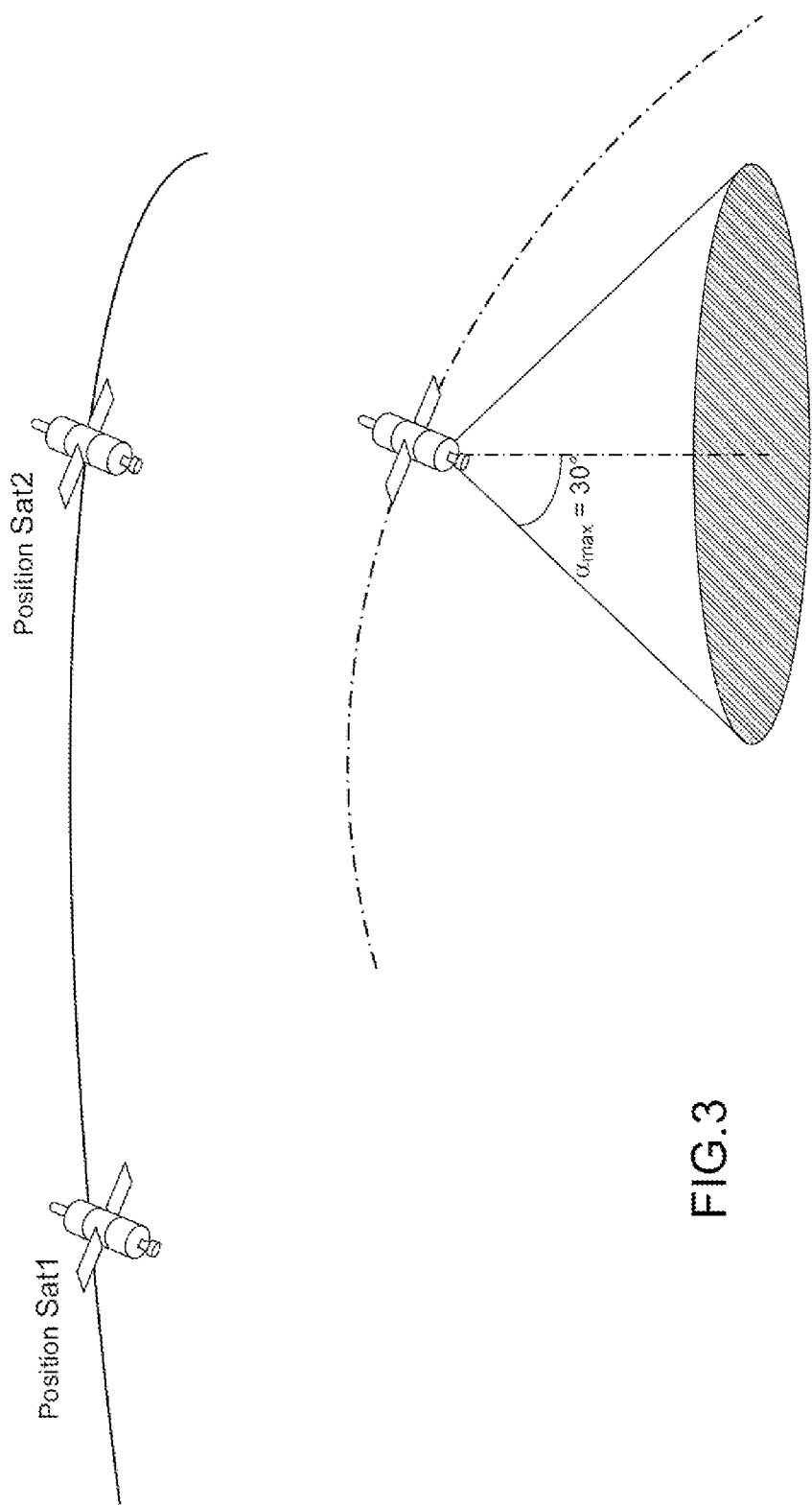
FIG. 3 illustrates schematically an angle of incidence with respect to the nadir of the satellites less than a maximum threshold, in this case 30°, according to one aspect of the invention.
Figure 4:
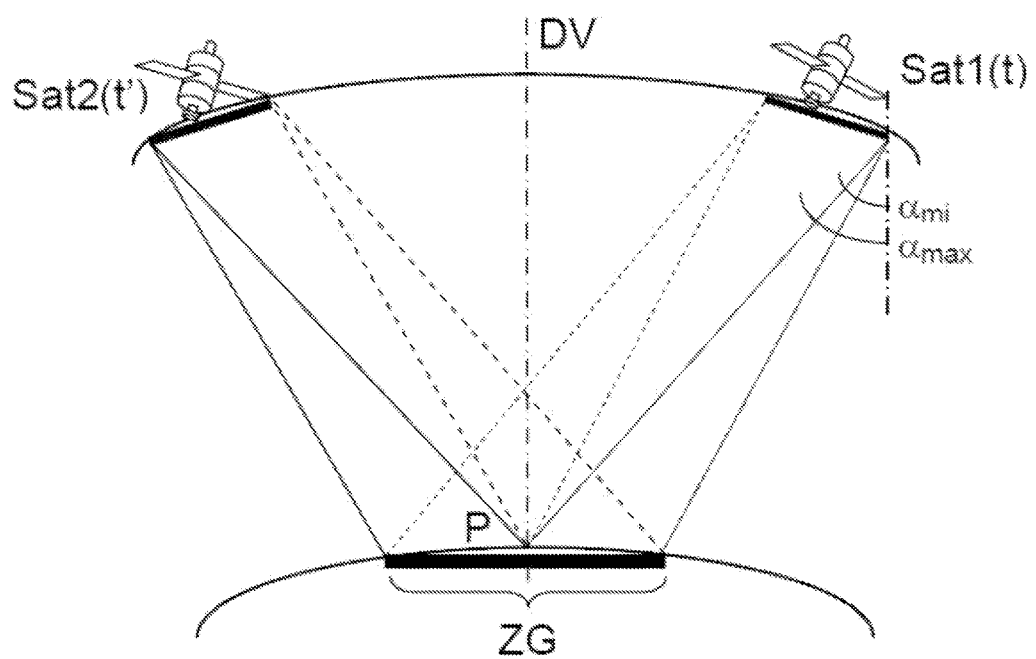
FIG. 4 illustrates the situation, on either side of a vertical line perpendicular to a geographical area of which images are to be taken, at the respective times when the images are taken.

The system for space-based imaging in three dimensions provided comprises:

at least two satellites in a geocentric orbit in the same orbital plane, each satellite being equipped with equipment for optical imaging in two dimensions and with a system for transmitting 102 to the ground the images in two dimensions, at least one data receiving station 104 on the ground, connected to a communications network 108, at least one centre for processing the images 106 received in two dimensions from the satellites in order to create resulting images in three dimensions and to broadcast the resulting images in three dimensions, the processing centre 106 being connected to the communications network 108, and an assembly for controlling 110 the satellites designed to control the satellites, for example by programming them, such that a geographical area of the Earth of which images are to be taken is seen under an angle of incidence with respect to the nadir greater than a minimum threshold $\alpha_{min}$ and/or less than a maximum threshold $\alpha_{max}$, as illustrated in FIG. 3.

For example, the minimum threshold $\alpha_{min}$ can be substantially equal to 0°, and/or the maximum threshold $\alpha_{max}$ can be equal to 30°.

The control assembly 110 can, in addition, be designed to control the satellites in such a manner that two of the satellites S1 and S2, at the respective times t and t' when the images are taken of a geographical area ZG of the Earth, are situated on either side of a vertical line DV perpendicular to the geographical area ZG. For example, the respective times t and t' when the two-dimensional images are taken of a geographical area of the Earth by the two satellites can be substantially identical.

The assembly for controlling 110 the satellites is designed to control the satellites in such a manner that the separation between the satellites allows the stereoscopic observation of the whole of the Earth's surface under various viewing conditions (roll, pitch of each of the satellites), as illustrated hereinafter.

The assembly for controlling the satellites is designed to control a roll angle and/or a yaw angle and/or a pitch angle of the satellites, such that a geographical area of the Earth of which images are to be taken is seen under an angle of incidence with respect to the nadir greater than a minimum threshold and/or less than a maximum threshold.

Figure 5:
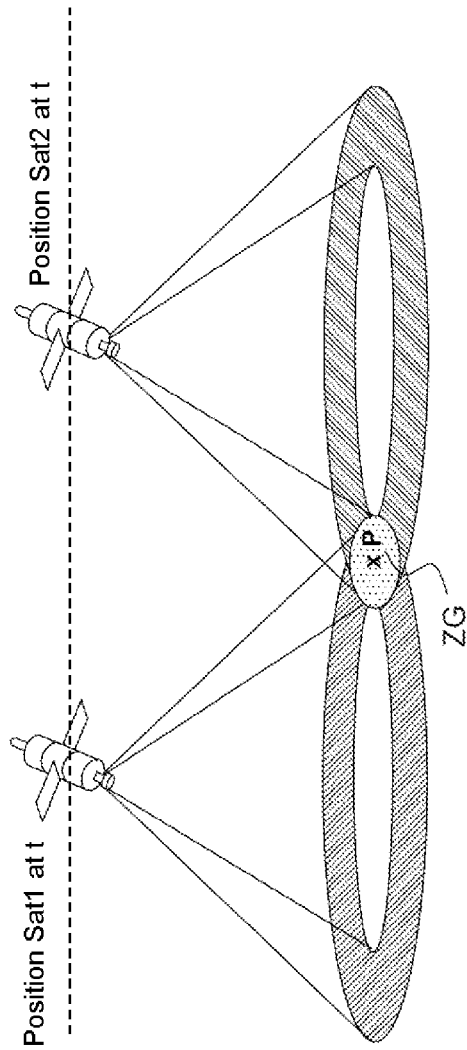
FIGS. 5, 6, 7, and respectively 8, 9 and 10, respectively show systems for space-based imaging in three dimensions, in cases of simultaneous visibility, of successive visibility, and of maximum separation between two successive satellites, according to one aspect of the invention.
Figures 8, 9, 10:
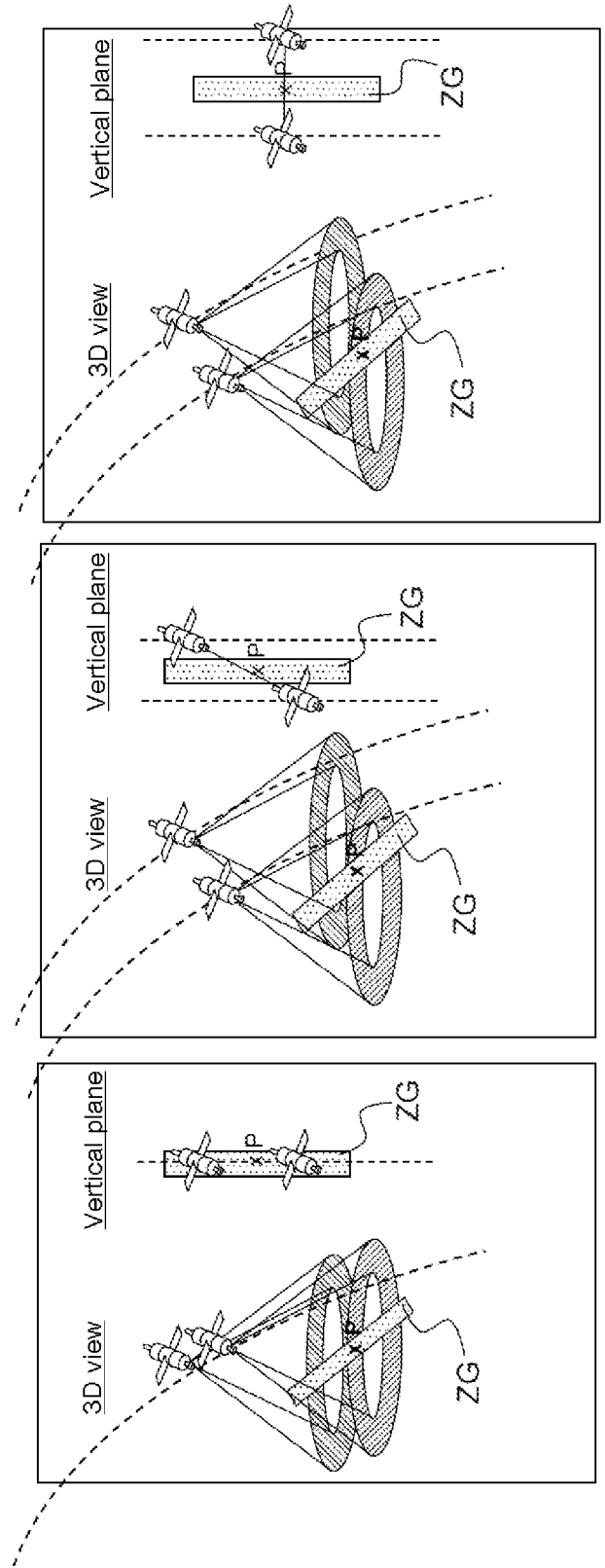

FIGS. 5 and 8 illustrate a geographical area ZG of which images are taken in two dimensions, and simultaneously, by two satellites from a group of satellites in a geocentric orbit in the same orbital plane. In this embodiment, the satellites are close enough to each other to allow this simultaneous acquisition while at the same time complying with the acquisition geometrical constraints.

For example, for two satellites from a group of satellites in a geocentric orbit at an altitude of 700 km, for photographs taken within a range of angles of incidences included between $\alpha_{min}=10°$ and $\alpha_{max}=30°$, the separation between the two satellites must typically be in the range between 275 km and 914 km in order to allow this simultaneous acquisition.

Figure 6:
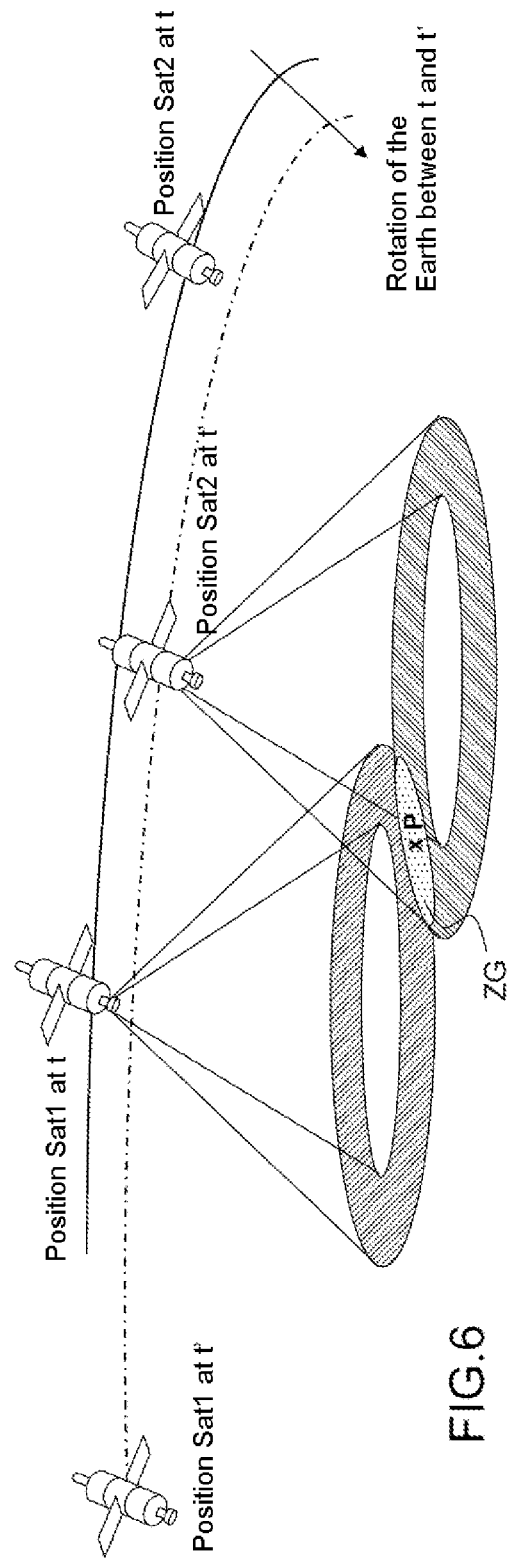

FIGS. 6 and 9 illustrate a geographical area ZG of which photographs are taken in two dimensions, at two separate times t and t' between which the Earth has rotated, by two satellites from a group of satellites in a geocentric orbit in the same orbital plane. The acquisition at two different times allows, by virtue of the rotation of the Earth, varied geometrical acquisition conditions: depending on the separation of the satellites, the relative positions at the time the photographs are taken mean that the orientation of the stereoscopic plane defined by the first satellite, the geographical area to be imaged, and the second satellite, can vary from the axis of the orbital plane to the perpendicular to the orbital plane, thus scanning all the photographic viewing conditions of the region: North-South, East-West stereoscopic planes, and all the intermediate cases, are accessible.

The control of the separation of the satellites thus allows the conditions for stereoscopic acquisition to be controlled for a region of given latitude.

For example, for observations at the respective times when the images of the geographical area of the Earth are taken, the satellites are situated on either side of a vertical line perpendicular to the geographical area, and the geographical area is also seen by the following satellite under an angle of incidence with respect to the nadir greater than a minimum threshold $\alpha_{min}=10°$ and/or less than a maximum threshold $\alpha_{max}=30°$. A separation of the satellites of around 7400 km for a heliosynchronous orbit at an altitude of 700 km enables acquisitions between latitudes going from the equator (0°) to 65°, under conditions of orientation of the stereoscopic acquisition plane varying as a function of the latitude: from East-West at the equator, to North-South at high latitudes. Conversely, the adjustment of the separation of the satellites allows the orientation of the stereoscopic acquisition plane for a region to be observed situated at a given latitude to be controlled.

Figure 7:
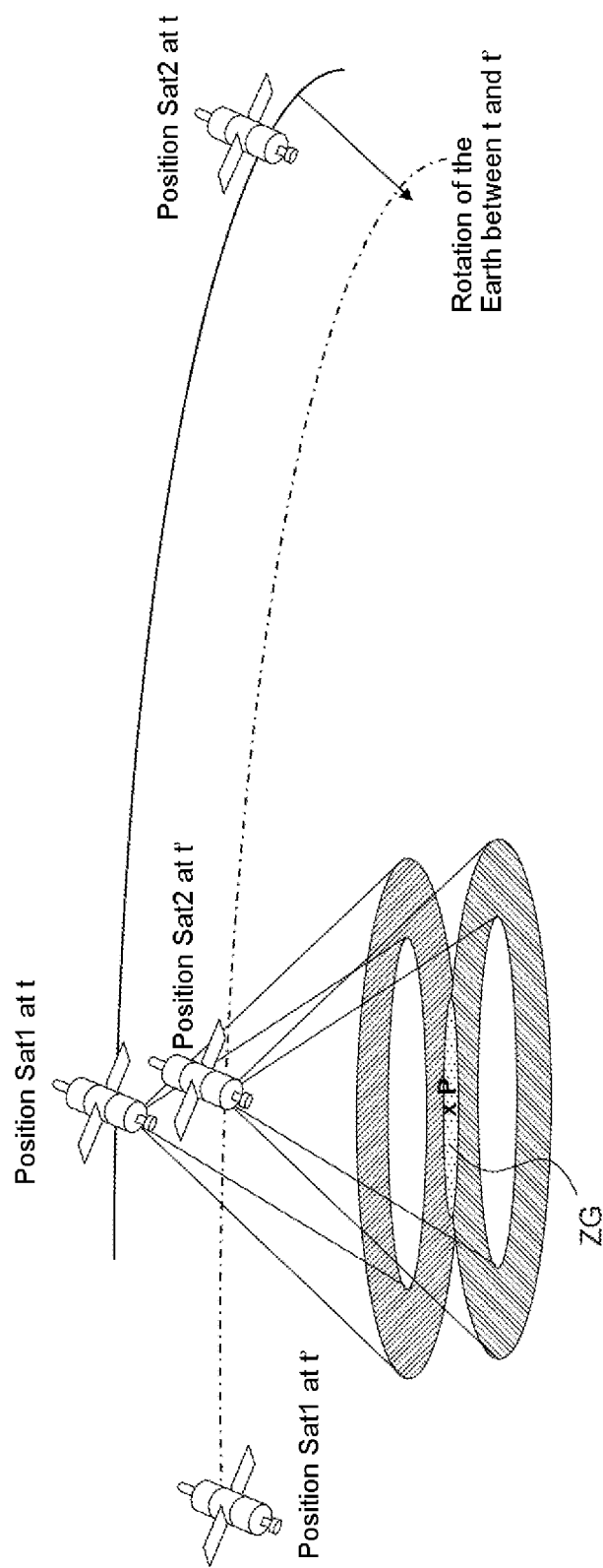

FIGS. 7 and 10 illustrate a geographical area ZG photographed in two dimensions, at two separate times t and t', between which the Earth has rotated and corresponding to a maximum separation between the two satellites from a group of satellites in a geocentric orbit in the same orbital plane.

A greater separation will mean that the projections on the ground of the respective ranges of incidences for each satellite [$\alpha_{min}$, $\alpha_{max}$] would not intersect, the Earth having rotated by too great an angle between the respective times of passage of the satellites able to view the geographical area to be observed. The geometrical acquisition conditions and the latitude of the region to be observed therefore limit the possible separations between the satellites considered for an acquisition.

For example, for satellites in a heliosynchronous orbit at an altitude of 700 km, it is no longer possible to observe the equatorial and tropical latitudes under geometrical conditions according to the stereoscopic acquisition if the satellites are distant typically by more than 9000 km. Conversely, the observation of geographical areas at very high latitudes with a stereoscopic plane perpendicular to the orbital plane can only be carried out with a very large separation of the satellites, owing to the proximity of the meridians to the pole.

For example, for satellites in a heliosynchronous orbit at 700 km, a separation of 13,500 km of the satellites is needed to enable such an acquisition at around 80° of latitude.

The present invention therefore has a global nature of applicability, in the geographical sense, because it allows the acquisition of stereo scenes with a wide variety of parameters:

for a given configuration of the system (adjustment of the separation of the satellites) the continuous control of the acquisition times and of the lines of sight of the satellites inside of the minimum and maximum range of incidence allows imaging of extended regions in stereo (global nature of applicability);

conversely, the adjustment of the separation of the satellites and of the acquisition times allows all the latitudes of the Earth to be covered under imaging conditions allowing a stereoscopic reproduction and inside of the minimum-maximum range of incidence indicated;

the adjustment of the separation of the satellites and of the acquisition times also allows data to be acquired according to a variety of view points with respect to a given scene, from the axis of the orbital plane (front and back axial views) up to the perpendicular axis (right/left lateral views), inside of the min-max range of incidence indicated.

The invention claimed is:

1. A system for space-based imaging in three dimensions comprising:
   at least two satellites in a geocentric orbit in a same orbital plane, at least two of said satellites being equipped with equipment for optical imaging in two dimensions and with means for transmitting to the ground images acquired in two dimensions in a configuration for stereoscopic acquisition between the satellites,
   at least one data receiving station on the ground, connected to a communications network,
   at least one centre for processing the images received in two dimensions from said satellites in order to create resulting images in three dimensions and to broadcast said resulting images in three dimensions, said processing centre being connected to said communications network, and
   means for controlling said satellites designed to control the satellites such that a geographical area of the Earth of which images are to be taken is seen under an angle of incidence with respect to a nadir greater than a minimum threshold and/or less than a maximum threshold.

2. The system according to claim 1, in which said minimum threshold is substantially equal to 0°, and/or said maximum threshold is equal to 30°.

3. The system according to claim 1, in which said control means are, in addition, designed to control the satellites in such a manner that, at the respective times when images of the geographical area of the Earth are taken, two of said satellites are situated on either side of a vertical line perpendicular to said geographical area.

4. The system according to claim 3, in which said respective times when the images of the geographical area of the Earth are taken by the two satellites are substantially identical.

5. The system according to claim 1, in which said means for controlling said satellites are designed to control the satellites in such a manner that the separation between said satellites allows observation of the area to be imaged at different times.

6. The system according to claim 1, in which said means for controlling said satellites are designed to control a roll angle and/or yaw angle and/or pitch angle of said satellites.

7. A method for space-based imaging in three dimensions comprising:
   processing of images in two dimensions taken by at least two satellites in a geocentric orbit in a same orbital plane and transmitted to at least one data receiving station on the ground, connected to a communications network;
   controlling said satellites in such a manner that a geographical area of the Earth of which images are to be taken is seen under an angle of incidence with respect to the nadir greater than a minimum threshold and/or less than a maximum threshold.

* * * * *